L. M. HOFTRUP.
POTATO DIGGER.
APPLICATION FILED FEB. 29, 1908.
906,426.
Patented Dec. 8, 1908.
3 SHEETS—SHEET 1.
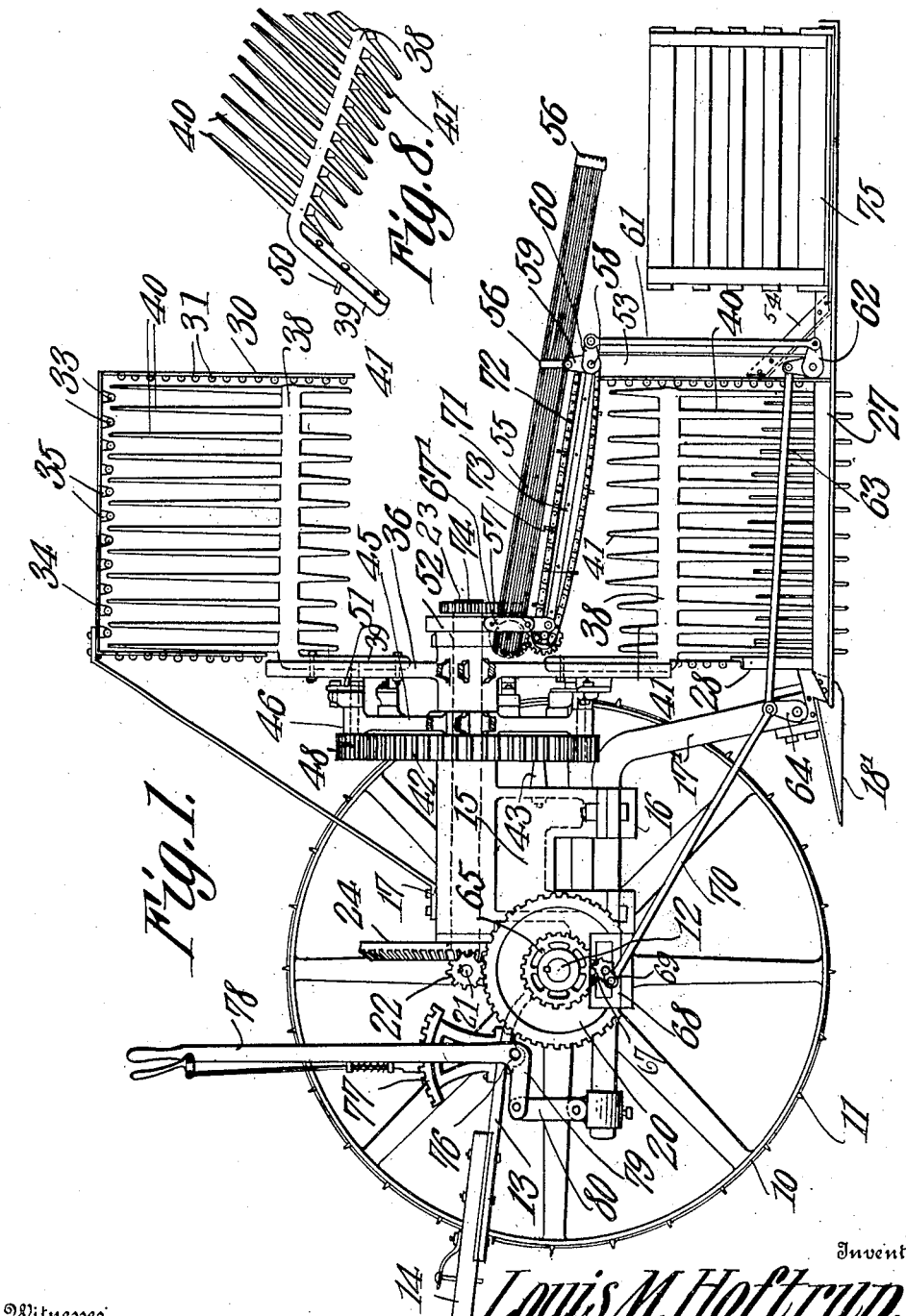
Witnesses
Inventor
Louis M. Hoftrup.
By C. A. Snow & Co.
Attorneys

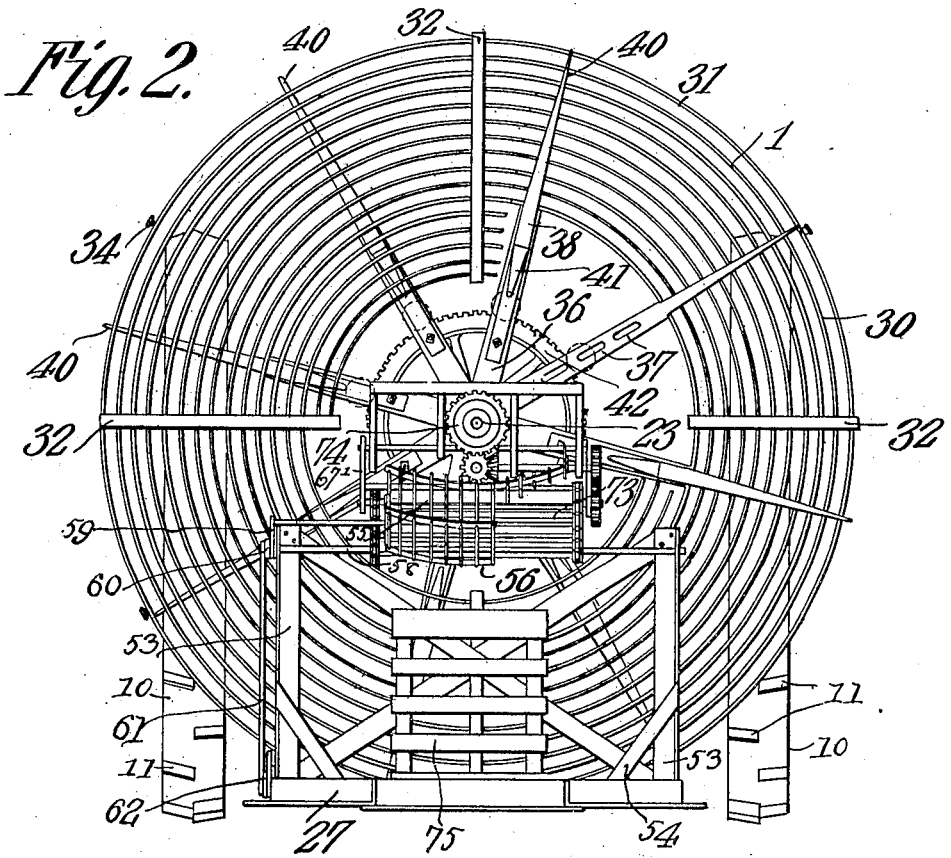

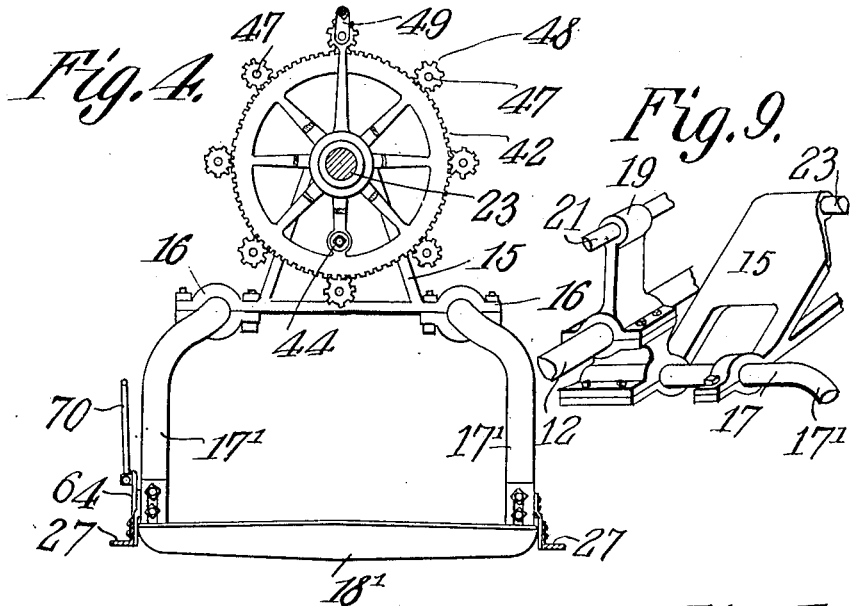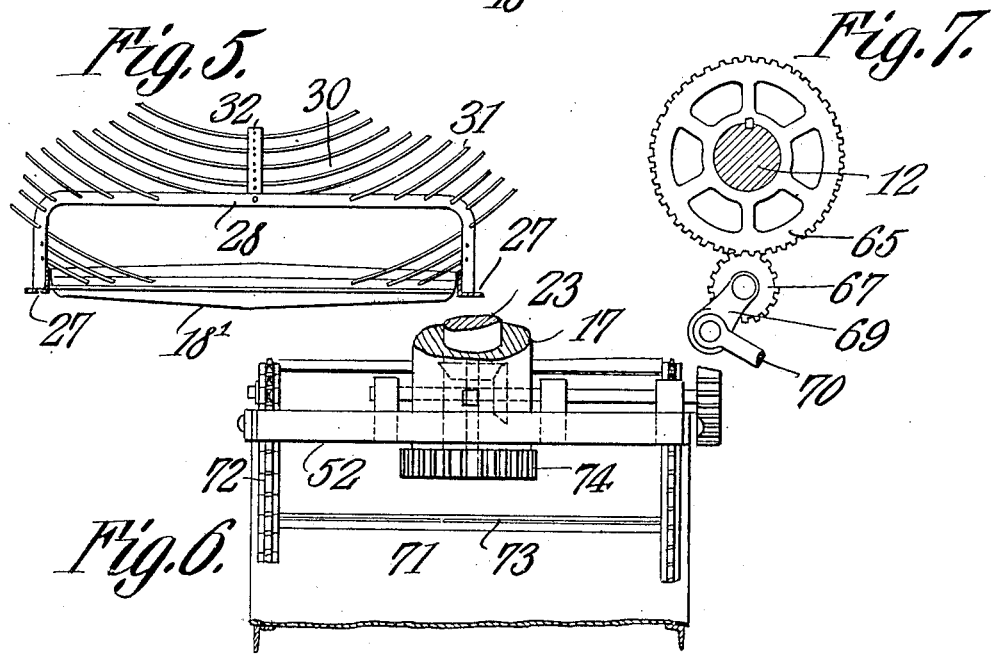

UNITED STATES PATENT OFFICE.

LOUIS M. HOFTRUP, OF PAINTED POST, NEW YORK.

POTATO-DIGGER.

No. 906,426.   Specification of Letters Patent.   Patented Dec. 8, 1908.

Application filed February 29, 1908. Serial No. 418,569.

*To all whom it may concern:*

Be it known that I, LOUIS M. HOFTRUP, a citizen of the United States, residing at Painted Post, in the county of Steuben and State of New York, have invented a new and useful Potato-Digger, of which the following is a specification.

This invention relates to agricultural implements, and more especially to that class which are used for digging roots of various sorts, such as potatoes and the like.

The object of the invention is to provide a potato digger having an improved form of mechanism whereby the earth dug up with the potatoes or the like may be separated therefrom without injury to the potatoes.

Another object of the invention is to provide an improved means in a potato digger whereby weeds and potato tops may be separated from the potatoes.

A further object of the invention is to provide a means whereby any stones dug up with the potatoes may be removed therefrom.

A still further object of the invention is to provide a means whereby the potatoes cleaned of all stones, tops, weeds, and so forth, may be crated or sacked ready for shipment.

The invention consists in general of a digging member having a cleaning and elevating screen of improved construction located rearwardly thereof, and a chute leading therefrom open to inspection, and arranged to deposit potatoes in a crate or the like.

The invention consists in certain novel features of construction and arrangement of parts, hereinafter fully described, illustrated in the accompanying drawings, and specifically claimed.

In the accompanying drawings:—Figure 1 is a longitudinal sectional view of the invention. Fig. 2 is a rear elevation of the device broken away in part, and with a portion of the mechanism in front removed. Fig. 3 is a detail view taken from the front, showing a portion of the operating mechanism of the machine. Fig. 4 is a detail view from the rear showing the mechanism for reciprocating the finger bars. Fig. 5 is a detail showing the opening in the cleaning screen. Fig. 6 is a detail of the operating mechanism at the rear of the longitudinal shaft, the view being taken in plan. Fig. 7 is an enlarged detail of the mechanism on the main axle for shaking the chute. Fig. 8 is a perspective view of one of the finger bars. Fig. 9 is a detailed view showing the mounting of the frame 15, upon the axle 12.

Similar numerals of reference are employed to indicate corresponding parts throughout the several figures of the drawings.

The body of the machine is supported on wheels 10 provided with traction blades 11 adapted to cause the wheel to rotate when the potato digger is drawn forward. These wheels are mounted on an axle 12 and are secured thereto so as to rotate said axle when the wheels are rotated, and upon this axle is loosely mounted a draft bar 13 provided with a tongue 14 to which draft animals may be secured. It is obvious that this draft bar may be made of Y-shape with a single tongue, or may be for a smaller size machine a pair of bars provided with shafts, or any other arrangement that may be deemed necessary for the proper hauling of the digger.

Mounted upon the axle 12 is a frame 15 provided with bearings 16 in the lower part thereof. In the upper part of the frame 15 is formed a bearing 17 preferably extending over the body of the frame, as clearly shown in Fig. 1. Upon the frame 15 are, also, formed bearings 18 and carried above these bearings are other bearings 19. Secured to the shaft 12 are gears 20. In the bearings 19 is carried a shaft 21 provided with pinions 22 meshing with the gears 20. In the sleeve 17 is held a shaft 23 preferably disposed lengthwise of the machine. A bevel gear 24 is mounted on the shaft 23 and pinions 25 on the shaft 21 mesh with this bevel gear. Clutches 25' are held to rotate with the shaft 21 and are arranged by suitable mechanism to be caused to engage one of the gears 25 and actuate the same and thus transmit motion from the shaft 21 to the shaft 23 in either direction. In the bearings 16 are held the beams 17', and to the plow or shovel 18' is secured the lower end of the beams by a foot casting, as at 28. Extending rearwardly from the digging member 18' is a frame 27 preferably composed of a pair of angle irons. Upon the frame 27 and immediately behind the digging member 18 is carried a secondary frame 28 securely attached to the frame 27, as clearly shown in Fig. 5.

Mounted on the frame 27 and the auxiliary frame 28 is a stationary screen 30 preferably of circular form and having the central portion thereof open. The axis of this screen 30 is concentric with that of the shaft 23. The sides of the screen are preferably formed of a series of concentrically disposed wires or rods 31 placed at suitable intervals with braces 32. The periphery of the screen is preferably composed of wires or rods 33 mounted on bars 34. The bars 34 are provided with a series of inwardly extending relatively short fingers 35 adapted to carry the wires 33 at the inner faces thereof. Upon the shaft 23 is secured a spider 36 here shown as provided with eight arms, although it is obvious as many arms may be used as desired. The outer ends of these arms are provided with slots 37.

Mounted on the spider 36 are a series of finger bars 38 having arms 39 formed thereon adapted to be held on the spider arms. These finger bars are so arranged with reference to the arms of the spider 36 that each bar is capable of reciprocal motion in and out on the arms to which it is attached. On the finger bars 38 there are preferably formed two series of fingers, one series, relatively long, extending outward toward the periphery of the screen, as at 40, the other series being relatively short and extending inward as at 41. The fingers 40 are so arranged as to length that when the finger bar 38 is in its outermost position, these fingers will project between the short fingers 35 of the screen 30. The amount of inward motion of each finger bar is arranged so that an article the size of the potatoes it is desired to crate will not pass between the wires 33 and the ends of the fingers 40 when the bar is drawn in. In order to reciprocate these bars there is mounted on the sleeve 17 a gear 42. This gear is prevented from rotating by a key or the like at the hub thereof, and a further means of securing it against rotation is provided at 43 in the shape of a boss on the frame 15, and a bolt or pin 44 on the gear. A spider 45 is mounted on the shaft 23 immediately adjacent the gear 42, and is provided at the outer end of its arms with bearings 46, each carrying a short shaft 47 whereon is mounted a gear 48 adapted to mesh with the gear 42. At the free end of each shaft is mounted a crank arm 49. A pin 50 is formed on the arm 39 of the finger bar 38 and is connected to the crank arm 49 by a link 51.

It will now be plain that as the machine is drawn forward and the shaft 23 made to revolve, the spider 45 and the spider 36 will both be carried around with the revoluble shaft. The gear 42 being fixed the gear 48 will be caused to revolve as they move around the gear 42. This in turn will actuate the crank arm 49 and through the links 51 will reciprocate the finger bars 38 as these bars pass around the screen 30.

The operation of the device up to the present point is as follows:—The machine being drawn forward, potatoes, earth, weeds and the like are all dug by the digging member 18, carried up and in through the open frame 28 and deposited in the screen 30. The finger bars 38 being caused to rotate as above described, will sweep the material thus dug around the periphery of the screen 30. By reason of the reciprocating motion of these bars, weeds and potato tops will be caught between the short fingers 35 of the screen 30 and the fingers 40 of the finger bars 38, and torn to pieces, thus permitting them to drop out through the interstices of the screen. However, the rotary and shaking motion imparted to the potatoes themselves will free them from a great portion of the earth which may have clung to them and all earth, weeds, and the like will be deposited outside of the screen, while the potatoes and other objects of like size will remain within the screen. In order to separate these latter, and, also, to convey the potatoes in the screen to a crate or the like, there is mounted on the end of the shaft 23 a bearing 52 in which the shaft is free to rotate. On the frame 27 are provided uprights 53 carried on a frame 54. Reciprocably mounted on the bearing 52 and the ends of the uprights 53 is a chute 55 which is preferably formed of a series of parallel disposed wires or rods spaced at suitable intervals by braces 56. This chute is downwardly inclined toward the rear end thereof, as seen in Fig. 1. To the front end there are attached to the bearing 52 links 67' adapted to permit the chute 55 to have motion in the direction of its length, and on the upper ends of the uprights 53 is mounted a rock shaft 58 provided with arms 59 attached to one of the braces 56 and an arm 60 connected to a rod 61. By means of the bell crank 62 and rod 63 this rod is connected in turn to a pivoted lever 64. Mounted on the shaft 12 is a gear 65 meshing with a pinion 67 carried in suitable bearings in a box 68. A crank arm 69 is mounted on the shaft of the gear 67 and is connected with the lever 64 by a rod 70. The operation of this portion of the device is accomplished by rotation of the shaft 12 and gear 65 revolving the pinion 67, thus actuating the crank arm 69. As the crank arm 69 rotates, the rod 70 will be drawn backwards and forwards and in turn through the various connections will actuate the rod 61 and cause the chute 55 to have a reciprocal or shaking motion. Now, when the potatoes or other articles of like size are carried up around the screen 30 by the finger bars 38, as these bars rise above the horizontal, the potatoes, stones and the like which may be carried thereon will roll down toward the center and be deposited on the chute 55. The shaking motion given to this chute, as above described, will cause the various articles to pass slowly down toward the lower end thereof and stones and other extraneous material may be picked out, leaving the potatoes free from such substances to drop off the end of the chute. The action of the chute 55 has a further tendency to remove any dirt which may remain clinging to the potatoes when they fall thereon, shaking and jolting them about and rendering them perfectly clean. The dirt will be all shaken from the potatoes at the upper end of the screen, and to prevent the same from falling back into the other potatoes on the large screen 30 there is provided a platform 71 supported on the frame 54 and the upper end of the uprights 53. Upon this frame is mounted a conveyer 72 provided with flights 73 extending across the platform. By means of the train of gears shown at 74, the conveyer is moved along the platform 71 and any dirt which may drop through the chute 55 will be carried to the end of the conveyer and dropped on the ground between the angle bars of the frame 27. The frame 27 has a rearwardly extending portion, as seen in Fig. 1, and this portion is adapted to carry a crate 75. It is obvious that in place of the crate 75 here shown, the rearwardly extending portion of the frame 27 may be so arranged as to support a bag, if desired.

The full operation of the device in brief is, that the potatoes and earth dug up by the digging member 18, are deposited on the screen 30, carried therearound by the finger bars 38 and deposited on the chute 55 being partially cleaned at that time. The chute 55 takes the remaining portion of the earth from the potatoes and they pass down the same to the lower end thereof, stones and the like being removed by hand on the way and the cleaned potatoes dropping into the crate 75.

In order to provide means for causing the member 18 to operate in different depths of earth, there is provided a rock shaft 76 and quadrant 77, mounted on the shafts 13. A latch lever 78 and rocker arm 79 are mounted on said rock shaft and links 80 connect the rock arm with the forward end of the beam 17. It will be obvious that the angular relation of the shafts and beam 17 will be changed as the position of the latch lever is changed and that the device will be thus adapted for digging at various depths.

It is obvious that many minor changes may be made in the form and construction of the invention without departing from the principles of the same, and it is not, therefore, desired to be confined to the exact form herein shown and described, but to include all such as properly come within the scope of the invention.

What is claimed is:—

1. In a potato digger, a cleaning screen, finger bars arranged to rotate around said cleaning screen, and reciprocate radially thereof, a digging member arranged to deposit potatoes or the like on said screen, and means for actuating said finger bars.

2. In a potato digger, a frame, an axle mounted on said frame, a wheel carried on said axle to rotate therewith, a digging member carried by said frame, a cleaning screen adapted to receive material excavated by said digging member, a chute in said screen leading out therefrom, finger bars arranged to rotate around the screen and reciprocate radially thereon to lift potatoes or the like and deposit them on said chute, and means connected to said axle and bars to rotate and reciprocate the latter.

3. In a potato digger, a frame, an axle mounted on said frame, wheels carried on said axle, a digging member carried by said frame, a substantially circular screen having its axis transverse of said wheel axle adapted to receive material excavated by said digging member, a chute in said screen leading out therefrom, finger bars arranged to rotate around said casing and reciprocate radially thereof to lift potatoes or the like and deposit them on said chute, and means connected to said axle and bars to rotate and reciprocate the latter.

4. In a potato digger, a frame, an axle mounted on said frame, wheels carried on said axle to rotate therewith, a digging member carried by said frame, a screen adapted to receive material excavated by said digging member, a chute in said screen leading out therefrom arranged to reciprocate longitudinally, means connecting said chute to said axle to reciprocate the same, finger bars arranged to rotate around said screen to lift potatoes and the like and deposit them on said chute, and means connected to said axle and bars to rotate the latter.

5. In a potato digger, a frame, an axle mounted on said frame, wheels carried on said axle to rotate therewith, a digging member carried by said frame, a screen adapted to receive material excavated by said digging member, a chute in said screen leading out therefrom arranged to reciprocate longitudinally, means connecting said chute to said axle to reciprocate the same, finger bars arranged to rotate around said screen and reciprocate radially therein, and means connected to said axle and bars to rotate and reciprocate the latter.

6. In a potato digger, a frame, an axle mounted in said frame, wheels carried on said axle to rotate therewith, a cleaning screen arranged transversely of said axle, a second axle concentric with the axis of said screen, gearing connecting said first mentioned axle to said second axle, a spider mounted on said second axle provided with a plurality of arms, finger bars slidably mounted on said spider revolving within said screen, and means carried on said frame and said second axle to reciprocate said finger bars radially of said screen.

7. In a potato digger, a frame, an axle mounted on said frame, wheels carried on said axle to rotate therewith, a digging member carried by said frame, a screen adapted to receive material excavated by said digging member, a chute in said screen leading out therefrom comprising a plurality of spaced rods adapted to permit earth or the like to pass therethrough, and a conveyer held beneath said chute arranged to convey material passing therethrough to a point exterior of said screen.

8. In a potato digger, a frame, an axle mounted on said frame, wheels carried on said axle to rotate therewith, a second axle mounted transversely on said first axle of said frame, a substantially circular screen having its axis coincident with said second axle, finger bars arranged to rotate with said second axle carried in said screen, means carried by said second axle and said frame adapted to reciprocate said finger bars radially of said screen, a reciprocating chute held within said screen and extending out therefrom, means connected to said first mentioned axle to reciprocate said chute, a conveyer held beneath said chute, and means connected to the second mentioned axle to actuate said conveyer.

9. In a potato digger, a cleaning screen provided with a series of internally extending fingers, finger bars held in said screen to rotate therein and arranged to co-act with the fingers thereon, and means for rotating said finger bars.

10. In a potato digger, a cleaning screen, a plurality of sets of internally projecting fingers, finger bars provided with fingers arranged to extend between the screen fingers held to rotate and reciprocate radially in said screen, and means for rotating and reciprocating said finger bars.

11. In a potato digger, a frame, an axle mounted on said frame, wheels carried on said axle to rotate therewith, shafts connected to said axle, a digging member carried by said frame, means connecting said shafts and digging member to vary the angular relation thereof with reference to each other, a screen adapted to receive material excavated by said digging member, a chute in said screen leading out therefrom, finger bars arranged to rotate around the screen and reciprocate radially therein to lift potatoes or the like and deposit them on said chute, and means connected to said axle and bars to rotate and reciprocate the latter.

12. In a potato digger, a frame, an axle mounted in said frame, wheels carried on said axle to rotate therewith, a cleaning screen arranged transversely of said axle, a second axle concentric to the axis of said screen, a bevel gear mounted on said second axle, a third axle, gearing connecting the first and third axle to continuously rotate the latter in one direction, pinions mounted on the third axle meshing with the bevel gear, and clutches on said third axle mounted to rotate with the same and arranged to engage one of said pinions and rotate the second axle in either direction.

In testimony that I claim the foregoing as my own, I have hereto affixed my signature in the presence of two witnesses.

LOUIS M. HOFTRUP.

Witnesses:
MARY T. MULLANEY,
F. R. HARE.